(12) United States Patent
Quddus et al.

(10) Patent No.: US 10,007,840 B2
(45) Date of Patent: Jun. 26, 2018

(54) SYSTEM FOR VIDEO BASED FACE RECOGNITION USING AN ADAPTIVE DICTIONARY

(71) Applicant: Alcohol Countermeasure Systems (International) Inc., Toronto (CA)

(72) Inventors: Azhar Quddus, Toronto (CA); Xiaoming Nan, Guelph (CA); Naimul Khan, Toronto (CA); Ling Guan, Toronto (CA)

(73) Assignee: Alcohol Countermeasure Systems (International) Inc., Toronto, Ontario (CA)

( * ) Notice: Subject to any disclaimer, the term of this patent is extended or adjusted under 35 U.S.C. 154(b) by 0 days. days.

(21) Appl. No.: 14/986,344

(22) Filed: Dec. 31, 2015

(65) Prior Publication Data

US 2016/0188964 A1    Jun. 30, 2016

Related U.S. Application Data

(60) Provisional application No. 62/098,411, filed on Dec. 31, 2014.

(51) Int. Cl.
*G06K 9/00* (2006.01)
*G06K 9/62* (2006.01)

(52) U.S. Cl.
CPC ........... *G06K 9/00288* (2013.01); *G06K 9/00* (2013.01); *G06K 9/00899* (2013.01); *G06K 9/6297* (2013.01)

(58) Field of Classification Search
CPC ........... G06K 9/00288; G06K 9/00228; G06K 9/6297; G06K 9/00899; G06K 9/6202;
(Continued)

(56) References Cited

U.S. PATENT DOCUMENTS

2006/0251338 A1*  11/2006  Gokturk ............ G06F 17/30253
                                           382/305
2006/0251339 A1*  11/2006  Gokturk ............ G06F 17/30253
                                           382/305
(Continued)

OTHER PUBLICATIONS

H.S. Bhatt, R. Singh, and M. Vatsa, "On recognizing faces in videos using clustering based re-ranking and fusion," IEEE Transactions on Information Forensics and Security, vol. 9, pp. 1056-1068, Jul. 2014.
(Continued)

*Primary Examiner* — Aklilu Woldemariam
(74) *Attorney, Agent, or Firm* — Head, Johnson, Kachigian & Wilkinson, PC

(57) ABSTRACT

The method includes a dictionary including a target collection defined by images that are known with a defined level of certainty to include a subject and an imposter collection defined by images of individuals other than the subject. In the method, images of an area are captured over a period of time. In respect of each image: a matching calculation is carried out, based upon a comparison of the image captured with the images in the dictionary to result in a measure of confidence that the subject is in the area; and an inference determination is made to replace one of the target collection images with a further image that is known with the defined level of certainty, the determination being a function of the measure of confidence resultant from the captured image, the measure resultant from one or more previously captured images and the associated capture times.

15 Claims, 4 Drawing Sheets

(58) Field of Classification Search
CPC ........... G06K 9/00536; G06K 9/00046; G06K 9/2018; G06K 9/00771; G06K 9/00087; G06K 9/00281; G06K 9/00355; G06K 9/746; G06F 17/30244; G06F 17/30268; G06F 17/30289; G06F 19/22; G06F 19/24; G06F 17/30297; G06F 21/316; G06F 21/32; G06F 3/0346; G06F 3/038; G06F 3/0482; G06F 3/04842; G06F 3/04847; G06F 3/167; F41H 13/00; F41H 13/0093; H04N 5/2355; G10L 15/22; G10L 21/0216; G06T 11/00; G06T 2207/10004; G06T 2207/10016; G06T 2207/20221; G06T 2207/30201; G06T 7/70; G06T 2207/10116; G06T 2207/30232; G06T 7/62; A61B 17/7074; A61B 2034/105; A61B 2034/107; A61B 2034/2055; A61B 2034/2068; A61B 2034/2072; A61B 2090/363; A61B 2090/364; A61B 2090/3929; A61B 2090/3945; A61B 2090/3954; A61B 2090/3979; G01N 2223/419; G01N 2223/637; G01N 23/046; G01V 5/0016; G01V 5/0058
USPC ....... 382/103, 115, 118, 218, 225, 305, 128, 382/170, 209, 199
See application file for complete search history.

(56) References Cited

U.S. PATENT DOCUMENTS

| | | | | |
|---|---|---|---|---|
| 2010/0250497 | A1* | 9/2010 | Redlich | F41H 13/00 707/661 |
| 2010/0266168 | A1* | 10/2010 | Wang | G06K 9/001 382/124 |
| 2011/0304625 | A1* | 12/2011 | Gerhard | G06T 11/00 345/428 |
| 2013/0155474 | A1* | 6/2013 | Roach | G06Q 20/322 358/505 |
| 2013/0218858 | A1* | 8/2013 | Perelman | G06F 17/30867 707/706 |
| 2015/0078628 | A1* | 3/2015 | Anderson | G06K 9/00228 382/115 |
| 2015/0169952 | A1* | 6/2015 | O'Malley | G06F 17/30244 382/225 |
| 2015/0205992 | A1* | 7/2015 | Rowe | G06K 9/2018 382/124 |
| 2015/0235379 | A1* | 8/2015 | O'Gorman | G06T 7/2033 382/103 |
| 2017/0031904 | A1* | 2/2017 | Legrand | G06F 17/30994 |

OTHER PUBLICATIONS

L. Wolf, T. Hassner, and I. Maoz, "Face recognition in unconstrained videos with matched background similarity," in IEEE Conference on Computer Vision and Pattern Recognition. 2011, pp. 529-534, IEEE.

J. Wright, A.Y. Yang, A. Ganesh, S.S. Shastry, and Y. Ma, "Robust face recognition via sparse representation," IEEE Transactions on Pattern Analysis and Machine Intelligence, vol. 31, pp. 210-227, Feb. 2009.

A. Wagner, J. Wright, A. Ganesh, Z. Zhou, H. Mobahi, and Y. Ma, "Towards a practical face recognition system: Robust alignment and illumination by sparse representation," IEEE Transactions on Pattern Analysis and Machine Intelligence, vol. 34, pp. 372-386, Feb. 2012.

H. Zhang, Y. Zhang, and T.S. Huang, "Pose-robust face recognition via sparse representation," Pattern Recognition, vol. 46, pp. 1511-1521, 2013.

J.R. Barr, K.W. Bowyer, P.J. Flynn, and S. Biswas, "Face recognition from video: A review," International Journal of Pattern Recognition and Artificial Intelligence, vol. 26, 2012.

G. Shakhnarovich, J.W. Fisher, and T. Darell, "Face recognition from long term observation," in European conference on Computer Vision. 2002, pp. 851-868. IEEE.

M. Nishiyama, M. Yuasa, T. Shibata, and T. Wakasugi, "Recognizing faces of moving people by hierarchical image-set matching," in IEEE Conference on Computer Vision and Pattern Recognition. 2007, pp. 1-8, IEEE.

R. Wang, S. Shan, X. Chen, and W. Gao, "Manifold-manifold distance with application to face recognition based on image set," in IEEE Conference on Computer Vision and Pattern Recognition. 2008, pp. 1-8, IEEE.

M. Kim, S. Kumar, V. Pavlovic, and H. Rowley, "Face tracking and recognition with visual constraint in real-world videos," in IEEE Conference on Computer Vision and Pattern Recognition. 2008, pp. 1-8, IEEE.

X. Liu and T. Chen, "Video-based face recognition using adaptive hidden markov models," in IEEE Conference on Computer Vision and Pattern Recognition. 2003, pp. 340-345, IEEE.

Y.C. Chen, V.M. Patel, P.J. Phillips, and R. Chellappa, "Dictionary-based face recognition from video," in European Conference on Computer Vision. 2012, pp. 766-779, IEEE.

Y.C. Chen, V.M. Patel, S. Shekhar, and R. Chellappa, P.J. Phillips, "Video-based face recognition via joint sparse representation," in IEEE International Conference on Automatic Face and Gesture Recognition. 2013. pp. 1-8, IEEE.

H.S. Bhatt, R. Singh, and M. Vatsa, "On rank aggregation for face recognition from videos," in International Conference on Image Processing. 2013, pp. 1-5, IEEE.

Terence Sim, Sheng Zhang, Rajkumar Janakiraman, and Sandeep Kumar, "Continuous verification using multimodal biometrics," Pattern Analysis and Machine Intelligence, IEEE Transactions on, vol. 29, No. 4, pp. 687-700, 2007.

Mauricio Pamplona Segundo, Sudeep Sarkar, Dmitry Goldgof, Luciano Silva, and Olga Bellon, "Continuous 3d face authentication using rgb-d cameras," In Computer Vision and Pattern Recognition Workshops (CVPRW), 2013 IEEE Conference on. IEEE, 2013, pp. 64-69.

P. Viola and M.J. Jones, "Robust real-time face detection," International Journal of Computer Vision, vol. 57, No. 2, pp. 137-154, May 2004.

H. Li, G. Hua, Z. Lin, J. Brandt, and J. Yang, "Probabilistic elastic matching for pose variant face identification," in IEEE Conference on Computer Vision and Pattern Recognition. 2013, pp. 3499-3506, IEEE.

Z. Cui, W. Li, D. Xu, S. Shan, and X. Chen, "Fusing robust face region descriptors via multiple metric learning for face recognition in the wild," in IEEE Conference on Computer Vision and Pattern Recognition. 2013, pp. 3554-3561, IEEE.

H. Mendez-Vazquez, Y. Martinez-Diaz, and Z. Chai, "Volume structured ordinal features with background similarity measure for video face recognition," in International Conference on Biometrics. 2013, pp. 1-6, IEEE.

F. Schroff, T. Treibitz, D. Kriegman, and S. Belongie, "Pose, illumination and expression invariant pairwise face-similarity measure via doppelganger list comparison," in International Conference on Computer Vision. 2011, pp. 2494-2501, IEEE.

A .Y. Yang, Z. Zhou, A.G. Balasubramanian, S.S. Shastry, and Y. Ma, "Fast ι1-minimization algorithms for robust face recognition." IEEE Transactions on Image Processing, vol. 22, pp. 3234-3246, Aug. 2013.

* cited by examiner

SYSTEM FOR VIDEO BASED FACE RECOGNITION USING AN ADAPTIVE DICTIONARY

CROSS-REFERENCE TO RELATED APPLICATIONS

This application claims priority to U.S. Provisional Patent Application Ser. No. 62/098,411, filed Dec. 31, 2014, incorporated herein by reference in its entirety.

BACKGROUND OF THE INVENTION

1. Field of the Invention

The invention relates to the field of automated facial recognition.

2. Description of the Related Art

Automated face recognition from video can be used for variety of applications. One known method for face recognition is the sparse representation-based (SRC) face recognition method. This method is based on the theory that the probe image (test sample) lies in the subspace spanned by the training images from the same class. By way of explanation, assume the i-th training class consists of $n_i$ training samples $$A_i = [S_{i,1}, S_{i,2}, \ldots, S_{i,n_i}].$$

If a new probe image y belongs to the subspace spanned by the i-th class, then:

$$y = \alpha_{i,1} s_{i,1} + \alpha_{i,2} s_{i,2} + \ldots + \alpha_{i,n_i} s_{i,n_i} \quad (1)$$

where $\alpha_{i,j}$ are weight coefficients, $j = 1, \ldots, n$.

Since the membership of y is unknown, there can be built a training matrix A, where all the matrices for different training classes are concatenated together. If there are M total training classes, then the matrix is defined as:

$$A = [A_1, A_2, \ldots, A_M] = [s_{1,1}, s_{1,2}, \ldots, s_{M,n_M}] \quad (2)$$

From this, the reconstruction of y from the training images can be expressed by the following equation:

$$y = A x_0 \quad (3)$$

where $x_0$ is of the form $$x_0 = [0, 0, \ldots, 0, \alpha_{i,1}, \alpha_{i,2}, \ldots, 0]$$

i.e. only the coefficients corresponding the class that y belongs to are non-zero, all the others are zero. If the number of classes M is sufficiently large, the solution $x_0$ is sparse. Hence, the sparsest solution to the following $l^1$-minimization problem is sought:

$$x_1 = \arg \min \|x\|_1$$

$$s.t. Ax = y. \quad (4)$$

Here, $\|\cdot\|_1$ represents the $l^1$ norm.

For a probe image y, the solution $x_i$ is found by solving the above minimization problem. In an ideal case, only the coefficients corresponding to the representative class of probe image y will be non-zero. However, practical training datasets will have some inherent noise, and, hence, some non-representative coefficients will also have non-zero values. In order to classify a probe image, a reconstruction is sought for each class. For a solution x, Let $\delta_i(x)$ represents a vector in which only the coefficients corresponding to class i are kept from the entries of x, all the other entries are set to non-zero. Then, the reproduced probe image from only class i can be represented by $A\delta_i(x)$. The residual $\|y - A\delta_i(x)\|$ represents the reproduction error. y is assigned to the class that results in the minimum residue:

$$\min_i r_i(y) = \|y - A \delta_i(x_1)\|_2 \quad (5)$$

Instead of training a classifier and mapping the probe image through it as is done in some conventional training test paradigms, the SRC algorithm solves a minimization problem for every probe image. Due to the sparse nature of the solution, the occlusion, illumination and noise variations are also sparse in nature.

OVERVIEW

Underlying the method is the concept of dynamic incorporation of the probe image into the training matrix. A critical part of such an approach is determining when the training matrix needs to be updated. Since the training matrix will be updated based upon a failure to correctly classify the current probe image, it is crucial that this detection step be designed carefully. One way to trigger the process will be to update the matrix whenever the current probe image fails to be classified into the same class as the previous image; however an impostor can easily trick such a naive system.

To guard against such weaknesses, the method involves a confidence criterion to trigger the update step and a scheme to prevent impostors.

SUMMARY OF THE INVENTION

Forming one aspect of the invention is a method for assessing the presence of a subject in an area over a period of time, the method comprising the steps of:

maintaining a dictionary including: a target collection defined by a plurality of images that are known with a defined level of certainty to include the subject; and an imposter collection defined by a plurality of images of individuals other than the subject;

capturing a plurality of images of the area over the period of time; and in respect of each image captured, carrying out a matching calculation, based upon a comparison of the image captured with the images in the dictionary to result in a measure of confidence that the subject is in the area; and making an inference determination to replace one of the images in the target collection with a further image that is known with the defined level of certainty, the determination being a function of the measure of confidence resultant from the captured image, the measure of confidence resultant from one or more previously captured images and the times of capture thereof.

According to another aspect of the invention, in the method, if the measure of confidence resultant from the captured image is in excess of a defined threshold, replacement can not occur.

According to another aspect of the invention, the further image can be selected from the one or more previously captured images and the captured image based upon a calculation that compares the similarity of the captured image and previously captured images to the target collection and the time between the respective image captures.

According to another aspect of the invention, a portion of the images in the target collection at the beginning of the period can define a static portion of the target collection.

According to another aspect of the invention, the static portion can be a nil portion such that all images in the target collection at the beginning of the period are susceptible to replacement.

According to another aspect of the invention, no image in the target collection that was not in the target collection at the beginning of the period is replaced until such time as all of the images in the target collection but for the static portion have been replaced.

The presence of a subject in an area over a plurality of time periods can be assessed by applying the method to each of the time periods such that each of the time periods is associated with a respective application of the method.

According to another aspect of the invention, the target collection at the commencement of each application of the method can be one and the same.

According to another aspect of the invention, the static portion of the target collection can be the same in each application of the method.

According to another aspect of the invention, the images in the target collection can be initially generated in an enrolment process adapted to result in a plurality of images that are representative of images that are likely to be captured when the subject is in the area and are suitable for recognition purposes.

According to another aspect of the invention, the enrolment process can involve a photography session wherein the subject is photographed in a variety of poses.

According to another aspect of the invention, the imposter collection can be defined by a plurality of photographs of each of the individuals other than the subject.

According to another aspect of the invention, the imposter collection can be defined by a plurality of photographs of each of the individuals other than the subject.

According to another aspect of the invention, the plurality of photographs of each individual other than the subject can be a plurality of photographs of said each individual in the variety of poses.

According to another aspect of the invention, the variety of poses can be defined by head shots with angular variation up to 15° from face-front.

According to another aspect of the invention, the matching calculation can be a sparse representation based classification calculation using the sparse dictionary.

According to another aspect of the invention, the inference determination is a determination based upon a Bayesian inference scheme.

Advantages and features of the invention will become apparent upon a review of the following detailed description with reference to the accompanying drawings, the latter being briefly described hereinafter.

DETAILED DESCRIPTION OF THE INVENTION

Figure 1:
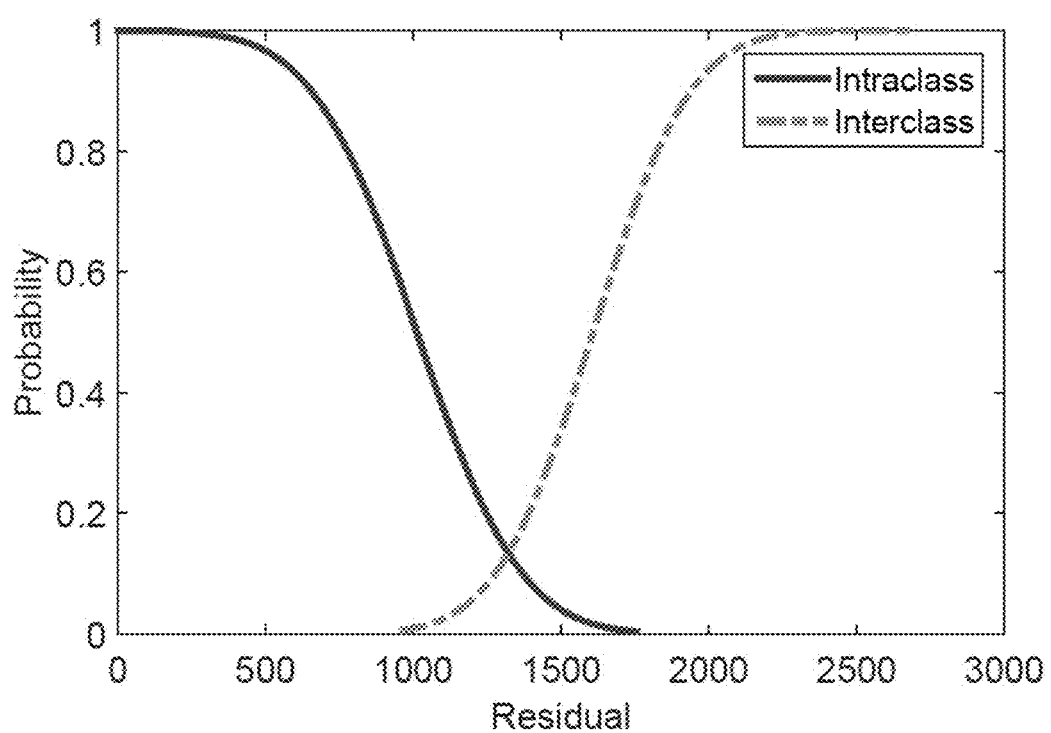
FIG. 1 is a plot of image likelihood based upon residual.

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

From training videos, frontal face images are extracted and a training matrix A is built in the same way as Equation 2. In operation, the training matrix is dynamically updated by evaluating the confidence criterion and the posterior probability in the Bayesian inference scheme.

Let, the probe video y consists of K frames $$y = \{y_1, y_2, \ldots, y_K\}.$$

For each frame, the $l^1$ optimization problem described in Equation 4 is solved.

The residue value $r_i(y)$ for class i is also calculated using Equation 5.

At this stage, the method differs from the SRC approach. Before classifying the current probe image as belonging to the class with the minimum residue, we calculate our confidence criterion:

$$P = e^{-\frac{|d - max(d)|}{r}} \tag{6}$$

Here, d denotes the difference between the minimum and the second-minimum residue, max(d) denotes the highest value of d seen so far for the test video in question. r is a tuning parameter that controls the sensitivity of the confidence criterion P. The value of P varies between 0 and 1. The proposed confidence criterion essentially determines whether the classification result for the current probe image is acceptable or not. The higher the value of P, the more confident the system is that the probe image is being classified correctly.

To avoid the interposition of an imposter's face or invalid photo into the training set, a Bayesian inference scheme is employed which utilizes the temporal information between frames to decide if the update is safe. Let $X_t$ be the state at time t. $X_t$ can be one of the two values $X_t \in \{Safe, Unsafe\}$. The state Safe means that the current user is correctly classified, although the confidence criterion P is lower than the threshold, which may caused by a pose change. The state Unsafe means that the current user is much likely an imposter and adding the probe image into training set is unsafe. Let $Y_{1:t}$ be the history observations from beginning to time t. With Bayesian theorem, the objective is to maximize the posterior probability $P(X_t|Y_{1:t})$. If $p(X_t = Safe|Y_{1:t}) > p(X_t = Unsafe|Y_{1:t})$, it is safe to update; otherwise, it is unsafe. According to Bayesian inference, the posterior probability $P(X_t|Y_{1:t})$ can be given by:

$$p(X_t|Y_{1:t}) = \lambda_t p(Y_t|X_t) p(X_t|Y_{1:t-1}),$$

$$p(X_t|Y_{1:t}) = \Sigma_{X_{t-1}} p(X_t|X_{t-1}, Y_{1:t-1}) p(X_{t-1}|Y_{1:t-1}), \tag{7}$$

where $\lambda_t$ is the normalization factor, which is independent with $X_t$. If the observations are assumed to be independent, both mutually and with respect to the dynamic process, we can derive $$p(X_t | X_{t-1}, Y_{1:t-1}) = p(X_t, Y_{1:t-1} | X_{1:t-1}) \frac{p(X_{1:t-1})}{p(X_{1:t-1}, Y_{1:t-1})} \tag{8}$$

$$= p(X_t, X_{1:t-1})$$

Face recognition in video can be assumed to form a temporal Markov chain [15]. Thus, the new state is conditioned directly on the preceding state and independent of the earlier history. So, we have $p(X_t|X_{1:t-1})=p(X_t|X_{t-1})$. Based on the above analysis, the posterior probability $p(X_t|Y_{1:t})$ in Equation (7) can be simplified as $$p(X_t, Y_{1:t}) = \lambda_t p(Y_t | X_t) \sum_{X_{t-1}} p(X_t | X_{t-1}) p(X_{t-1} | Y_{1:t-1}) \quad (9)$$

where $p(X_t|X_{t-1})$ is the transition probability of the dynamic process, and $p(Y_t|X_t)$ is the image likelihood. Equation (8) is a recursive function, which can be efficiently computed by using the posterior probability $p(X_{t-1}|Y_{1:t-1})$ at time t-1.

In order to acquire the image likelihood $p(Y_t|X_t)$, we use the residual $r_i(y)$ as the feature. In sparse representation, $r_i(y)$ denotes the distance between the probe image and the reconstructed image by sparse coding. A higher residual means a larger reconstruction error. In the exemplary embodiment, the image likelihood $p(Y_t|X_t)$ is given by the intraclass (when $X_t$=Safe) or interclass (when $X_t$=Unsafe) cumulative distribution functions, which is shown in FIG. 1.

Given a probe image, one firstly calculates the confidence criterion P. If the criterion is lower than the predefined threshold, Equation 8 is used to acquire $p(X_t=Safe|Y_{1:t})$ and decide if the current update is safe. If so, a training image is picked from the classified class, and this training image is replaced with the current probe image. The update step incrementally replaces the images in the training matrix, i.e. at every step, one training image from the initial matrix gets replaced by the probe image. The process rolls over once all the beginning training images have been exhausted. In this way, the change of pose of the subject gradually gets incorporated into the training matrix.

To classify the whole video as belonging to a particular class, individual frame image results are accumulated and the current video is assigned to the class to which the highest number of frames was successfully classified into.

---

Algorithm 1 outlines the exemplary method.
Algorithm 1 The Proposed Method
1: Input: 1) Training image matrix A = [A₁, A₂, ... , A_M] extracted from training videos.
    2) Test video y = {y₁, y₂, ..., y_K}
2: for i ← (1, K) do
3:   Solve the $l^1$- minimization problem:
     $x_1 = \arg \min \|x\|_1$ s.t.Ax = $y_i$.
4:   Calculate the residue:
     $r_j(y_i) = \|y_i - A\delta_j(x_1)\|_2$, j = 1,2, ..., M.
5:   Calculate the confidence criterion:

$P = e^{\frac{-|d-max(d)|}{r}}$

6:   if P > threshold then
     identity(yi) = arg min($r_i$ ($y_i$)).
7:   else
8:   Calculate $p(X_t|Y_{1:t})$ by using Equation 8.
9:   if $p(X_t = Safe|Y_{1:t}) > 0.5$ then
10:      Pick an image from $A_j$, where j = identity of currently identified
         class.
11:  Replace the picked image with $y_i$ in A.

12:  else
13:      It is unsafe to update the training set.
14:  end if
15:  end if
16: end for
17: Output: identity(y) = Class j to which maximum number of frames from
    y were successfully classified into.

---

As can been seen, the confidence criterion P is continuously monitored throughout the classification of the test video. If the value of P is above a pre-defined threshold, the current frame is deemed to be classified successfully with a high confidence. Otherwise, the posterior probability $p(X_t|Y_{1:t})$ is computed. The decision is made according to the greater of $p(X_t=Safe|Y_{1:t})$ and $p(X_t=Unsafe|Y_{1:t})$. Since the sum of posterior probabilities is 1, we may determine if $(X_t=Safe|Y_{1:t})>0.5$. If $p(X_t=Safe|Y_{1:t})$ is greater than 0.5, an image from the training matrix belonging to the currently identified class is picked. This image is replaced by the current probe image. At the end of the process, the video is assigned the identity of the class to which the highest number of frames was successfully classified into.

The advantages of the method over known methods are three-fold:
  Due to intelligently updating the training matrix A, the proposed method can be robust to not only pose change, but any other unexpected change that may occur in an uncontrolled environment.
  the method does not have any computational overhead. In fact, the only extra operations over the classic SRC method are the calculation of the confidence criterion and the posterior probability. This contrasts with methods which maintain individual matrices for different pose conditions, such as
    "Dictionary Based face recognition from video", *European Conference on Computer Vision*, 2012, pp. 766-779, IEEE
    Terence Sim, Sheng Zhang, Rajkumar Janakiraman and Sandeep Kumar, "Continuous vertification using multimodal biometrics", *Pattern Analysis and Machine Intelligence, IEE Transactions*, vol 29, no 4 pp 687-700, 2007
  By using the Bayesian inference, the method can effectively utilize temporal information in video to detect if the current low criterion P results from a pose change or a subject change, which greatly reduces the risk of introducing an impostor's face into the training set

EXPERIMENTAL RESULTS

There was created an in-house video face database with 11 subjects. The subjects were asked to perform the following motions sequentially for a few seconds: 1) look straight, 2) look right, 3) look straight, 4) look left, and 5) look straight. From the videos, the face region was detected and cropped first using the detector described in P. Viola and M. J. Jones, "Robust real-time face detection", *International Journal of Computer Vision*, vol 0.57, no. 2, pp. 137-154, May 2014. The training matrix A was built using 40 frontal images for each of the 10 subjects. The cropped images were downsampled to the size of 10×10. That provided a training matrix A of size 100×400. The detected face images of the 11-th subject were then sequentially fed to the method as a test video. For each frame image, the confidence criterion value P was calculated as described by Equation 6 and the posterior probability p($X_t|Y_{1:t}$) as given by Equation 8.

Figure 2:
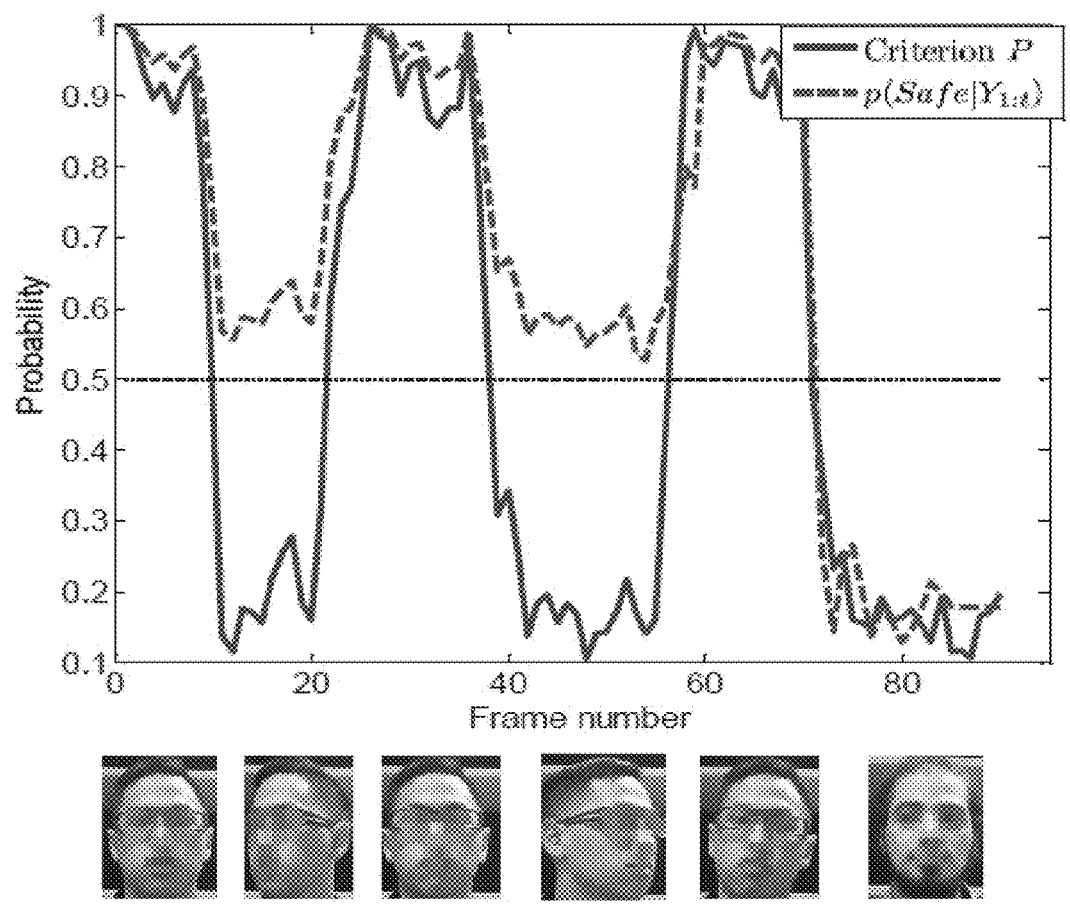
FIG. 2 is an analysis of confidence criterior and posterior probability.

FIG. 2 shows the change in the value of criterion P and posterior probability p(Safe|Yi:t) against the input frame images. Sample face images for the individual sections of the graph are shown below for reference (images have been blurred to respect anonymity). As can be seen, the value of P stays close to 1 when the subject is looking straight. As soon as the subject starts looking left or right, the value of P quickly goes down. This demonstrates that the confidence criterion can detect whether the subject's pose is changing. Furthermore, the posterior probability p($X_t$=Safe|$Y_{1:t}$) keeps above 0.5 (larger than p($X_t$=Unsafe|$Y_{1:t}$) even when the subject changes pose, but the probability drops below 0.5 immediately when an impostor appears into the video.

Figure 3:
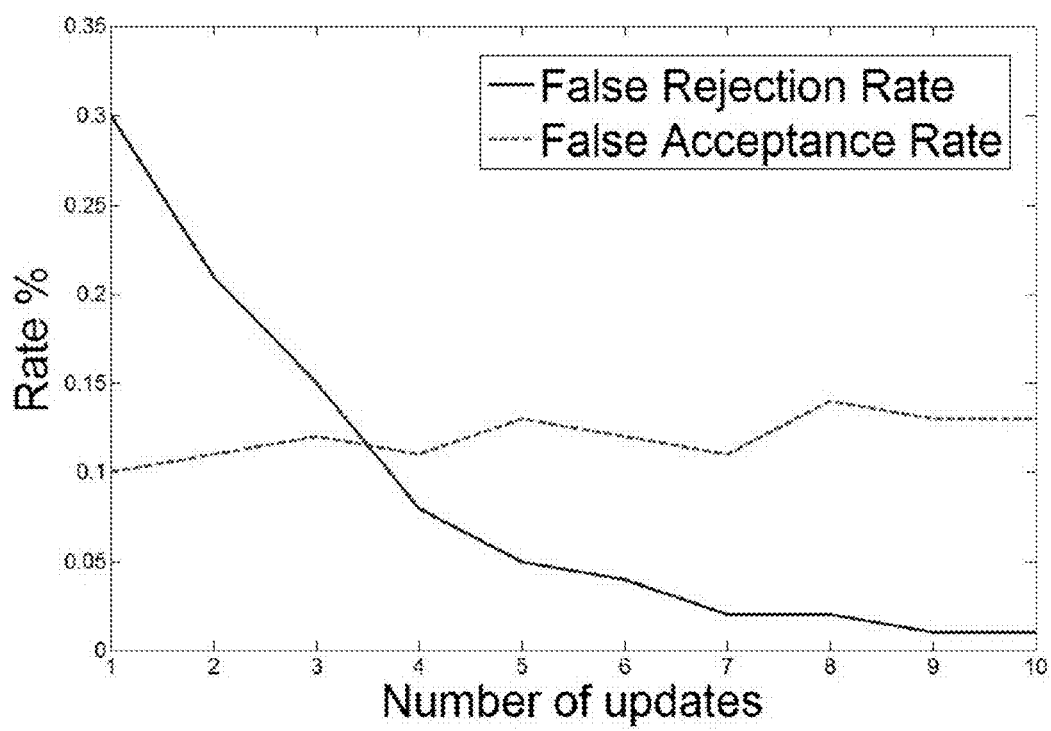
FIG. 3 shows the effect of the update step on FRR and Far.

To ensure the stability of the system, it is important to ensure that the False Acceptance Rate (FAR) does not increase while updating the matrix. To this end, the same experimental setup as before i.e. 10 subjects are used for training from our in-house database and 1 for testing. For the test phase, the training matrix was updated with the probe image whenever P falls below the threshold (0.5). Every time an update step takes place, FAR and FRR were recorded. The process was repeated 11 times treating each subject as test. FIG. 3 shows the change of FRR and FAR against the number of updates. As expected, the FRR decreases very quickly. In fact, after only 3 update steps it falls below 0.1. At the same time, the FAR does not increase significantly.

Figure 4:
FIG. 4 shows sample training images were accepted/rejected.
Figure 4:

100 subjects from the You-Tube database are picked at random. 15 frontal images per subject were extracted from videos of the selected subjects. Since these videos are uncontrolled, exactly frontal face images are difficult to find. The images within a pose variation of 15% were selected (FIG. 4). These extracted images were used to build an initial training matrix A. The detected and cropped face images were downsampled to a size of 15×15, which provided a matrix of size 225×1500.

For testing, the same criteria of same/not same output as described in "Face Recognition in uncontrolled videos with matched background similarity" [L. Wolf, T. Hassner and I. Maoz, *IEEE Conference on Computer Vision and Pattern Recognition,* 2011, pp. 529-534, IEEE] were adhered to. For the 100 subjects picked in the training phase, 100 pair of videos was picked randomly from the list of pairings. For each test pair, the identity of the subject in one of the videos was known. The other video of each pair was fed through the exemplary method. From the output assigned class, it was decided whether the test pair belonged to the same subject or not. This form of testing scheme allowed comparison of the obtained results to already published results. The random picking of the training subjects and testing pairs were repeated 10 times. The reported results are the average over the 10 runs.

To demonstrate the effectiveness of the confidence criterion and inference scheme, two versions of the method were tested, one with the update step and one without it. The one without the update step is essentially identical to the SRC method except the fact that it is being applied to videos. The sensitivity parameter r was set the same way as before i.e. half of max(d) found for the first frame of the current test video (Equation 6). The threshold for the confidence criterion to determine whether a classification result is valid or not was set to 0.5 as suggested before.

TABLE I

[RESULTS ON THE YOUTUBE FACE DATABASE]

| Method | % Accuracy |
|---|---|
| Proposed (without update) | 70.1 |
| Proposed (with update) | 82.9 |
| mindst LBP [2] | 65.7 |
| mindst FPLBP [2] | 65.6 |
| ‖U1' U2‖ LBP [2] | 65.4 |
| ‖U1' U2‖ FPLBP[2] | 64.3 |
| MBGS (mean) FPLBP [2] | 72.6 |
| MBGS (mean) LBP [2] | 76.4 |
| APEM-FUSION [18] | 79.1 |
| STFRD + PMML [19] | 79.5 |
| VSOF + OSS [20] | 79.7 |
| COTS [2] | 67.9 |
| MNF [2] | 76.4 |
| Schroff et al. [21] | 77.5 |
| Bhatt et al. [1] | 80.7 |

The first two rows of Table I shows the accuracy results obtained for the proposed method with and without the update step. It can be seen that the update strategy determined by the confidence criterion and inference scheme results in noticeable improvement of performance. The confidence criterion triggers the update of the training matrix, while the inference scheme prevents to include an impostor's face into the training matrix. As a result, more frames from the testing videos are being classified to the correct class. Since the final decision for the entire target video is based on the classification of the individual frames, the update strategy directly results in better results.

Rest of the comparison results were copied from "On recognizing faces in videos using clustering based re-ranking and fusion" [H. S. Bhatt, R. Singh and M. Vatsa, *IEEE Transactions on Information Forensics and Security,* vol 9, pp. 1056-1068, July 2014]. As can be seen, the proposed approach performs much better than any other known SRC method. Since the calculations added by our confidence criterion and update step can be done in constant time, the computational complexity of the proposed method is the same as the original SRC method, which is linear in terms of the number of training images. The experiments were implemented in MATLAB and performed on a Windows 8 laptop equipped with 16 GB of memory and an Intel Core i7 processor clocked at 2.2 GhZ. To solve the $l^1$ minimization problem, the dual augmented Lagrangian multiplier method proposed in "Fast t-minimization algorithms for robust face recognition" [*IEEE Transactions on Image Processing,* vol. 22, pp 3234-3426, August 2013] was used. For our in-house database, the CPU time achieved was 0.35 seconds per image, while for the YouTube database it was 0.9 seconds. Faster times can be achieved through optimized implementation and use of GPU programming.

Whereas a single exemplary embodiment is herein shown and described, it will be evident that variations are possible. For example, whereas in the exemplary embodiment, all of the training images are susceptible to replacement, this is not necessary, and a portion of the images may be preserved for continuity purposes.

As well, whereas in the exemplary embodiment, the captured image which fails the confidence determination is substituted in the training matrix if deemed appropriate by the inference determination, a previously captured image which passed the confidence determination could instead be substituted.

Accordingly, the invention should be understood to be limited only by the accompanying claims, purposively construed.

What is claimed is:

1. A method for assessing the presence of a subject in an area, the method comprising the steps of:
   capturing a plurality of photographs of the area over a period of time;
   maintaining, over the period of time, a dictionary, the dictionary including;
   a training matrix defined by a plurality of photographs of the area that are known with a defined level of certainty to include the subject, wherein a portion of the photographs in the training matrix at the beginning of the period define a static portion of the training matrix;
   and an imposter collection defined by a plurality of photographs of the area in respect of which it is known that the subject does not appear, wherein the imposter collection is defined by a plurality of photographs of individuals other than the subject;
   in respect of each photograph captured, and as each photograph is captured, carrying out a matching calculation, based upon a comparison of the photograph captured with the photographs in the dictionary to result in a measure of confidence that the subject is in the area;
   carrying out a calculation using the measure of confidence resultant from the captured, photograph, the measure of confidence resultant from one of the previously captured photographs and the times of capture thereof and making a determination responsive thereto based upon a statistical inference from posterior probabilities;
   and selectively replacing one of the photographs in the training matrix with the one of the previously captured the photographs responsive to the determination.

2. A method according to claim 1, wherein if the measure of confidence resultant from the captured photograph is in excess of a defined threshold, replacement does not occur.

3. A method according to claim 1, wherein the one of the previously captured photographs is selected from the one or more previously captured photographs and the captured photograph based upon a calculation that compares the similarity of the captured photograph and previously captured photographs to the training matrix and the time between the respective photograph captures.

4. A method according to claim 1, wherein the static portion is a nil portion such that all photographs in the training matrix at the beginning of the period are susceptible to replacement.

5. A method according to claim 1, wherein no photograph in the training matrix that was not in the training matrix at the beginning of the period is replaced until such time as all of the photographs in the training matrix but for the static portion have been replaced.

6. A method for assessing the presence of a subject in an area over a plurality of time periods, the method comprising the steps of:
   applying the method of claim 1 to each of the time periods such that each of the time periods is associated with a respective application of the method.

7. A method according to claim 6, wherein, the training matrix at commencement of each application of the method is one and the same.

8. A method according to claim 7, wherein the static portion of the training matrix is the same in each application of the method.

9. A method according to claim 1, wherein the photographs in the training matrix are initially generated in an enrolment process adapted to result in a plurality of photographs that are representative of photographs that are likely to be captured when the subject is in the area and are suitable for recognition purposes.

10. A method according to claim 9, wherein the enrolment process involves a photography session wherein the subject is photographed in a variety of poses.

11. A method according to claim 10, wherein the imposter collection is defined by a plurality of photographs of each of the individuals other than the subject.

12. A method according to claim 11, wherein the plurality of photographs of each individual other than the subject is a plurality of photographs of said each individual in the variety of poses.

13. A method according to claim 12, wherein the variety of poses is defined by head shots with angular variation up to 15° from face-front.

14. A method according to claim 1, wherein the matching calculation is a sparse-representation based classification calculation using the sparse dictionary.

15. A method according to claim 1, wherein the calculation using the measure of confidence is an inference determination based upon a Bayesian inference scheme.

* * * * *